UNITED STATES PATENT OFFICE.

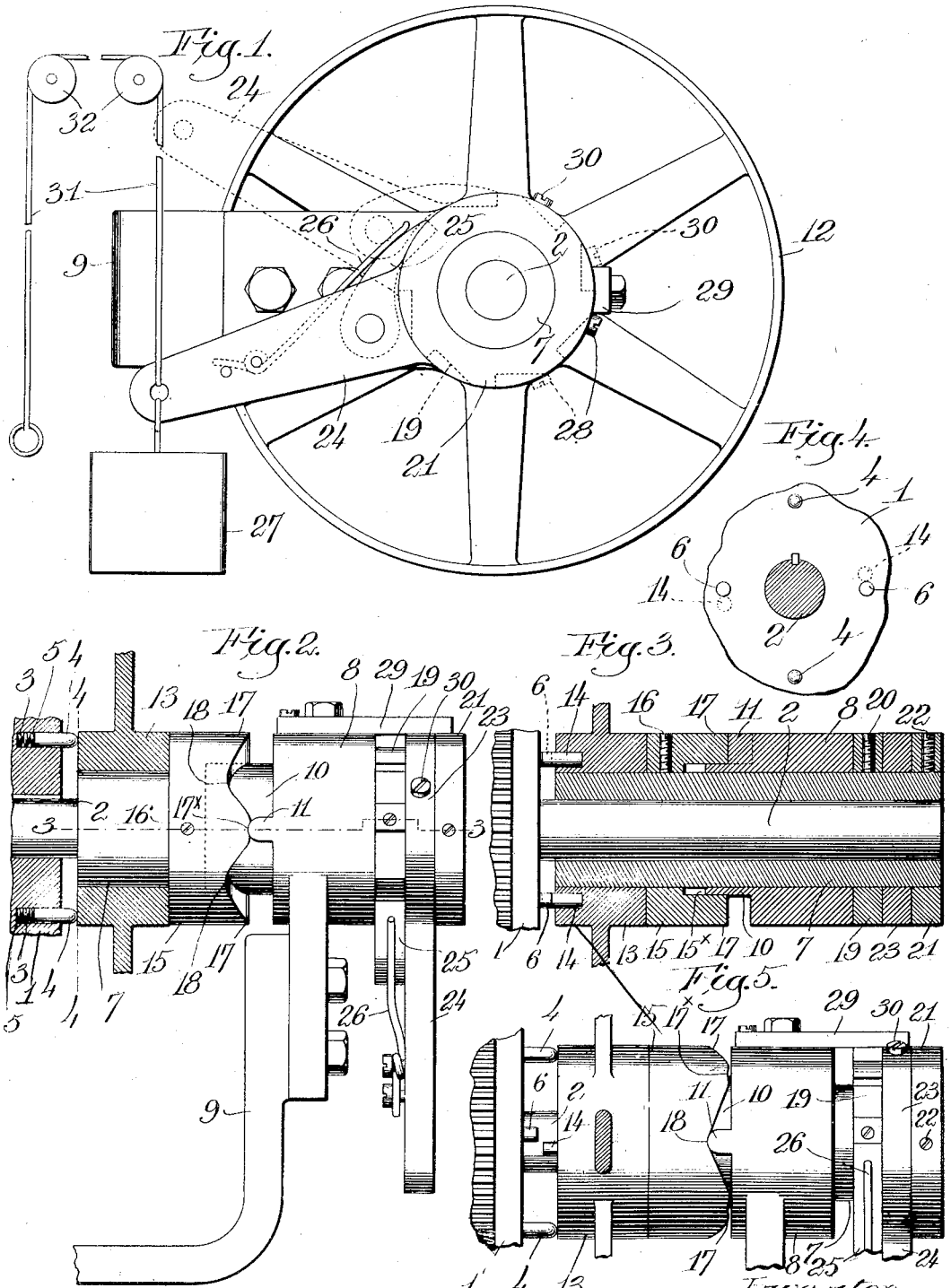

CHARLES HIRD, OF WOONSOCKET, RHODE ISLAND, ASSIGNOR, BY DIRECT AND MESNE ASSIGNMENTS, OF ONE-FOURTH TO COLIN C. BELL, OF BROOKLINE, MASSACHUSETTS, AND ONE-HALF TO GEORGE F. WILLETT, OF NORWOOD, MASSACHUSETTS.

CLUTCH.

No. 836,685.     Specification of Letters Patent.     Patented Nov. 27, 1906.

Application filed January 15, 1906. Serial No. 296,063.

*To all whom it may concern:*

Be it known that I, CHARLES HIRD, a subject of the King of Great Britain, and a resident of Woonsocket, county of Providence, State of Rhode Island, have invented an Improvement in Clutches, of which the following description, in connection with the accompanying drawings, is a specification, like numerals on the drawings representing like parts.

This invention has for its object the production of a novel, powerful, and quick-action clutch of simple and durable construction and so constructed and arranged that the actuator of the clutch-controlling means has a given movement always in the same direction to render the clutch operative or inoperative, means being provided to reset the actuator automatically after each operation thereof.

The various novel features of my invention will be fully described in the subjoined specification and particularly pointed out in the following claims.

Figure 1 is an end elevation of a clutch embodying one form of my invention, the actuator being shown in normal position by full lines and by dotted lines in the position temporarily assumed when the operation of the clutch is changed. Fig. 2 is a top plan view of the clutch apparatus shown in Fig. 1 with the driving and driven members in horizontal section, the clutch being shown as operative. Fig. 3 is a longitudinal section on the line 3 3, Fig. 2, the member to be driven and its attached shaft being in elevation. Fig. 4 is a partial inner face view of the member to be driven on the line 4 4, Fig. 2, looking toward the left; and Fig. 5 is a view similar to Fig. 2, but showing the clutch inoperative.

I have herein shown the driven member 1 of the clutch as a gear, Figs. 3 and 5, keyed or otherwise made fast on a rotatable shaft 2, the member 1 when rotated transmitting motion to any mechanism desired and not herein shown.

Sockets 3 are formed in the inner face of the driven member to receive plungers 4, having rounded outer ends and projecting at right angles from the face of the member 1, the bottoms of the plungers seating on springs 5 in the sockets, Fig. 2. Two of such plungers are herein shown diametrically opposite each other, as shown in Fig. 4; but more may be used, if desired, and two pins 6, serving as driving or transmitting abutments, are shown as fixedly secured in the inner face of member 1.

A sleeve 7 loosely surrounds the shaft 2 and is also capable of longitudinal movement thereon, the sleeve being rotatably mounted in a bearing 8, fixedly secured to a bracket 9 or other stationary support, the end of the bearing nearest the driven member being reduced in external diameter at 10, Fig. 3, for a purpose to be described, while a lug or projection 11 is formed thereon, as herein shown, rounded at its outer end, Figs. 2 and 5.

I have herein shown the driving member of the clutch as a pulley 12, (shown in full lines, Fig. 1,) its hub 13 being rotatably mounted on the inner end of sleeve 7 adjacent the driven member, the spring-acting plungers 4 bearing against the face of the hub, while pins or abutments 14 are fixedly secured on the hub. The said abutments are at the same distance from the center of the shaft 2 as are the abutments 6 referred to hereinbefore, so that when the driving member is moved toward the driven member into operative position, as in Figs. 2 and 3, the two sets of abutments will engage and the members 1 and 2 will rotate in unison.

When the springs 5 are free to act, they will operate, through the plungers 4, to separate the driving and driven members, as in Fig. 5, so that the two sets of abutments will clear each other and the clutch will then be open or inoperative with the driven member at rest. Adjacent the hub 13 I mount on the sleeve 7 a cam-collar 15, secured on the sleeve by a set-screw 16, and having a series of high portions 17 alternating with low portions 18 on the end nearest the bearing 8, the opposite flat end of the collar resting against the adjacent face of the pulley-hub 13. Each high portion has a slight depression 17* formed in it, and the low portions are similarly concaved, so that one or the other may receive the lug or follower 11. (See Figs. 2 and 5.)

It will be manifest that when the "cam-collar" or "cam," as it may be termed, is turned to bring one of its high portions into coöperation with the fixed follower or lug 11, as in Figs. 2 and 3, the cam will be forced to the left, moving the driving member 12 and the sleeve 7 with it to put the clutch into operation. At this time the springs 5 are compressed by the pressure on the plungers 4, so that the abutments 6 and 14 engage, the cavity 17ᵃ preventing any rotative movement of the sleeve and attached parts while the clutch is closed or operative.

Now if the cam 15 be turned far enough to bring the next low portion 18 opposite the follower 11 the springs 5 will act through the plungers to separate the driving and driven members, placing the parts in the position shown in Fig. 5, opening or rendering inoperative the clutch.

I have provided novel means for effecting the rotative movement of the cam to reverse the condition of the clutch, whether operative or inoperative, it being manifest that a step-by-step rotation of the cam in one and the same direction will alternately effect opening and closing of the clutch.

A ratchet 19 is fixed on the sleeve 7 by a set-screw 20 at the right-hand side of the bearing 8, the teeth of the ratchet corresponding in number to the high and low portions of the cam, eight teeth being shown by dotted lines in Fig. 1.

On the extreme right-hand end of the sleeve is secured a collar 21, held in place by a set-screw 22, and between the collar and ratchet is mounted the hub 23 of a pawl-carrier 24, having mounted upon it a pawl 25 to coöperate with said ratchet, a spring 26 being shown as arranged to direct the pawl into engagement with the ratchet-teeth, the hub 23 being loose upon the sleeve.

Referring to Fig. 1, a weight 27 is shown hung upon the free end of the pawl-carrier to normally move the same into full-line position with a stop 28 on the hub 23 in engagement with a fixed abutment 29, (shown as a bar rigidly secured to the bearing 8.)

A second stop 30 on the pawl-carrier hub is arranged to bring up against the opposite side of said abutment to limit the operative stroke of the pawl-carrier, as shown by dotted lines, Fig. 1.

Any convenient means for operating said pawl-carrier may be employed, as a flexible member 31, Fig. 1, carried up over one or more overhead guide-sheaves 32 and then down to a convenient position.

When the pawl-carrier is moved from full to dotted line position, Fig. 1, the pawl 25 engages a tooth of and advances the ratchet 19 one step, and through the sleeve 7 the cam 15 is turned an equal amount, reversing the condition of the clutch, whether operative or inoperative—that is, if the clutch was in operative condition the operative movement of the pawl-carrier reversed such condition, rendering the clutch inoperative, and vice versa, the high portions 17 of the cam corresponding to an operative and the low portions 18 to an inoperative condition of the clutch.

As soon as the pawl-carrier is released the weight 27 automatically resets it or returns it to starting position, the pawl clicking over the ratchet into engagement with the next tooth.

The cam 15 is cored out at 15ˣ, Fig. 3, to receive the reduced end 10 of the bearing 8 while permitting the lateral movement of the cam toward and from the bearing due to step-by-step rotation of said cam.

The cam and its fixed follower, the pawl and ratchet, and the connecting-sleeves 7 constitute controlling means for the clutch, and the pawl-carrier is an actuator, and is so termed in the claims, to effect the operation of the controlling means, the latter including said actuator.

It will be observed that the operative stroke or movement of the actuator is always in one direction to effect either opening or closing of the clutch, so that a common movement of said actuator serves to reverse the condition of the clutch.

After the actuator has been operated it is automatically reset, as described, and when the next change in the condition of the clutch is to be made the operative movement of the actuator is repeated.

My invention is not restricted to the precise construction and arrangement herein shown and described nor to any particular means, mechanical or otherwise, for effecting the operative movement of the actuator, for manifestly such movement may be accomplished automatically by mechanical means or it may be achieved manually.

Having described my invention, what I claim as new, and desire to secure by Letters Patent, is—

1. The combination, in a clutch, of a rotatable shaft having a driven member fast thereon, a coöperating driving member coaxially mounted with relation to the driven member and movable toward and from it, spring-acting means to separate said members, and controlling means for the clutch, including a rotatable cam, and an actuator to rotate the latter step by step, said actuator having a common movement in one direction to effect coöperation or disengagement of the driving and driven members, one forward step of the cam effecting coöperation and the next forward step disengagement of said members.

2. The combination, in a clutch, of a rotatable shaft having a driven member fast thereon, a coöperating driving member coaxially mounted with relation to the driven member and movable toward and from it, abutments on said members to engage when the members are moved toward each other, spring-acting means to separate said members, and controlling means for the clutch, including a rotatable cam, having alternating high and low portions, and a fixed coöperating part, and a pawl-and-ratchet mechanism to rotate the cam step by step in one direction, engagement of a high part of the cam with the fixed coöperating part effecting clutch action, the spring-acting means separating the clutch members when the low portions of the cam are in engagement with the fixed part.

3. The combination, in a clutch, of a rotatable shaft having a driven member fast thereon, a sleeve loose on and movable longitudinally of the shaft, a driving member rotatably mounted on the sleeve to coöperate with the driven member to rotate it, and clutch-controlling means carried by the sleeve, including a pawl-carrier angularly movable thereon and provided with a pawl, a ratchet part on the sleeve, whereby the latter can be turned step by step, a cam fast on the sleeve, and a fixed part with which it coöperates, movement of the high parts of said cam into engagement with said fixed parts effecting engagement of the driving and driven members, while movement of the low parts of the cam into such position effects disengagement of said members.

4. The combination, in a clutch, of coaxially-arranged driving and driven members movable toward and from each other, spring-acting means to separate the members, a rotatable cam having alternating high and low portions, to govern the relative position of the clutch members; a fixed part with which the cam coöperates, and manually-operated means to rotate the cam step by step, in one direction, to bring successively a high or a low portion thereof into coöperation with said fixed part at each forward step of the cam and thereby render the clutch operative or inoperative.

5. The combination, in a clutch, of coaxially-arranged driving and driven members movable toward and from each other, spring-acting means to separate the members, a rotatable cam having alternating high and low portions, to govern the relative position of the clutch members, a bearing for the clutch, having a part to coöperate with the cam, manually-operated means to rotate the cam step by step, to bring a high or a low portion thereof into coöperation with said part on the bearing, and means to reset automatically said manually-operated means.

6. The combination, in a clutch, of coaxially-arranged driving and driven members, and means to effect coöperation or disengagement thereof, said means including an actuator coaxially mounted with respect to said members and having an angular movement in one direction to render the clutch operative or inoperative, and means to effect automatically return movement of the actuator to starting position after each actuation thereof.

7. The combination, in a clutch, of coaxially-arranged driving and driven members, and means to effect coöperation or disengagement thereof, said means including an actuator coaxially mounted with respect to said members and having an angular movement in one direction to render the clutch operative or inoperative, means to effect automatically return movement of the actuator to starting position after each actuation thereof, and stops to limit such angular movement of the actuator.

8. The combination, in a clutch, of coaxially-arranged driving and driven members, and means to control the action of the clutch, said means including a pawl and ratchet, an angularly-movable actuator therefor, stops to limit such movement, operative movement of said actuator in one direction reversing the condition of the clutch, whether operative or inoperative, and a device to effect automatically return movement of the actuator to starting position after operation thereof.

9. The combination, in a clutch mechanism, of a rotatable shaft, a driven member fast thereon, a coöperating driving member rotatably and longitudinally movable upon and with relation to the shaft, and means to effect coöperation or disengagement of said members, said means including an automatically-reset actuator, operative movement of the actuator in one direction reversing the condition of the clutch, whether operative or inoperative.

In testimony whereof I have signed my name to this specification in the presence of two subscribing witnesses.

CHARLES HIRD.

Witnesses:
 WALTER R. RAY,
 BESSIE G. RICH.